L. L. CARTER.
OIL, GAS, AND WATER SEPARATOR.
APPLICATION FILED NOV. 7, 1921.
1,426,955.
Patented Aug. 22, 1922.
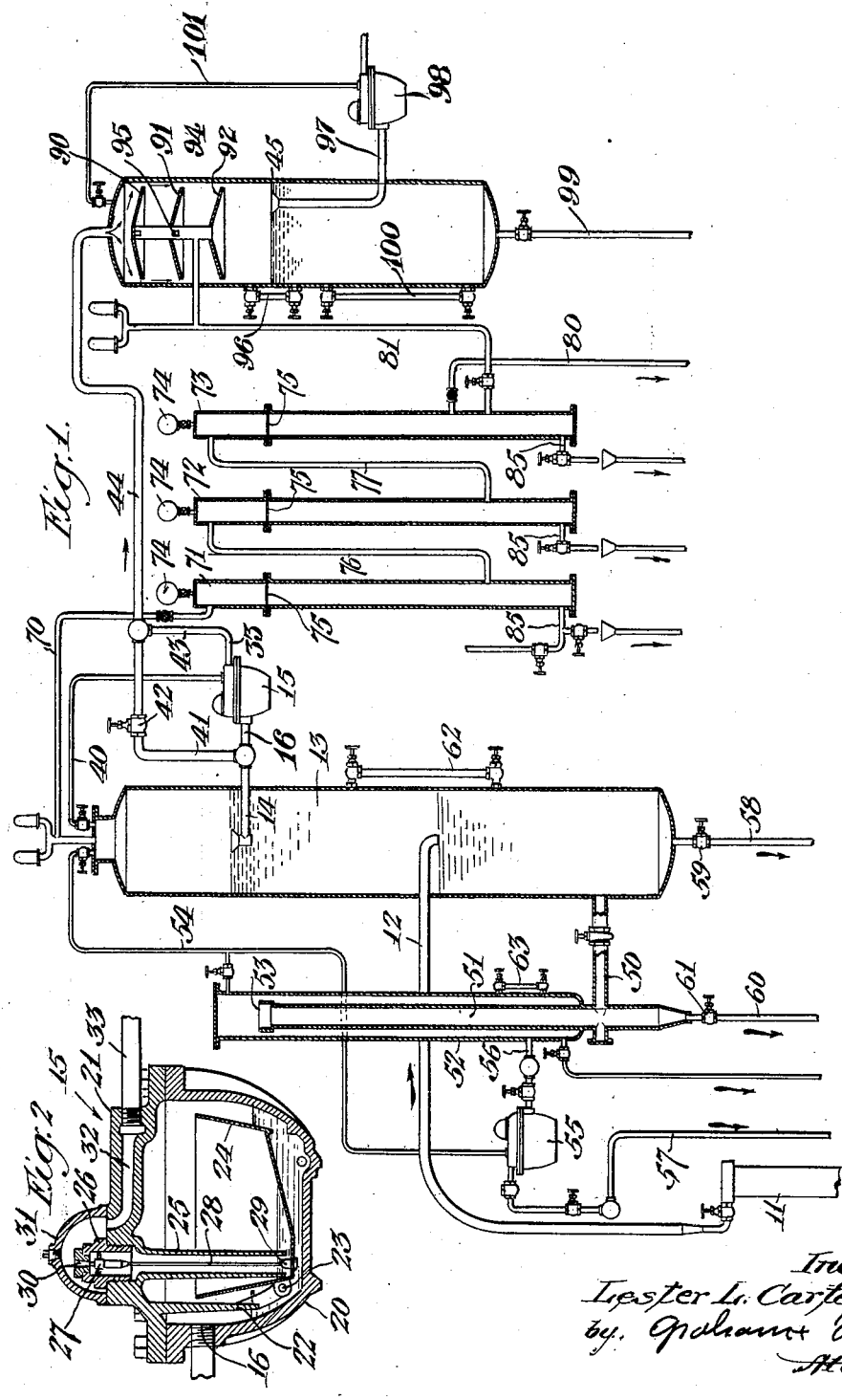

UNITED STATES PATENT OFFICE.

LESTER L. CARTER, OF SAN FRANCISCO, CALIFORNIA.

OIL, GAS, AND WATER SEPARATOR.

1,426,955.   Specification of Letters Patent.   Patented Aug. 22, 1922.

Application filed November 7, 1921. Serial No. 513,480.

*To all whom it may concern:*

Be it known that I, LESTER L. CARTER, a citizen of the United States, residing at San Francisco, in the county of San Francisco and State of California, have invented a new and useful Improvement in Oil, Gas, and Water Separators, of which the following is a specification.

My invention relates to separators which are used to remove water and gas from the oil produced by an oil well.

The principal object of my invention is to provide a device in which the water and gas are removed from the oil as it comes from the well, without danger of emulsification. Where oil and water are produced under pressure by an oil well, there is great danger of their becoming emulsified and the emulsions so produced are often very difficult to resolve into their component parts.

This emulsification most often occurs when the water and oil are together forced under pressure through a small orifice, such as a small hole or a partially closed valve. Since many oil wells produce oil, gas and water, under considerable pressure, and since it is common practice to reduce the pressure by allowing the fluid to flow through such a small orifice, it is evident that there is considerable danger that such emulsions may be formed. This, I prevent, by separating the fluid into its constituent parts while still under practically full well pressure and by relieving the pressure on the component parts separately.

Many previous inventors have provided separators for oil and gas in which a definite amount of oil is held in a separating chamber, this amount being regulated by a float carried in the chamber, and controlling a valve through which the oil is allowed to escape whenever the level of the fluid becomes high enough to raise the float and thus open the valve. Such devices are troublesome, as it is difficult to keep the float tight since both the float and the valve are either in the separating chamber, or immediately adjacent thereto.

A further object of my invention is to provide an apparatus in which the moving parts are not in the separating chamber, but are so located as to be easily accessible for inspection and repair. So far as I am aware, I am the first to provide a device which will remove the water and gas from the oil coming from an oil well, while this oil is still under pressure and which will operate entirely automatically under practical conditions.

Further objects and advantages will be made evident hereinafter.

Referring to the drawing, which is for illustrative purposes only:

Fig. 1 is a cross section showing a diagrammatic form of my invention.

Fig. 2 is a cross section through one of the oil and water traps used in practicing my invention.

In the form of my invention, shown in the drawing, 11 is a casing head of an oil well which delivers oil, gas and water, under pressure, through a pipe 12 into a separating chamber 13. In the separating chamber 13 the oil and water stratify, the water settling in the lower portion of the chamber and the oil floating on top of the water. The gas escapes from the oil into the upper part of the separating chamber 13. For the purpose of maintaining a definite liquid level in the chamber 13, I provide an outlet pipe 14 which delivers oil into an oil trap 15, through an opening 16.

The trap 15 consists of a body 20 and a cover 21. An apron 22 extends downwardly inside a central cavity formed in the body, as shown in Fig. 2. Pivoted at 23 is a pan 24, which is open at the top. An outlet pipe 25 sticks down inside the pan 24, a valve seat 26 being secured in the upper portion of the pipe 25. A valve 27 is carried on a valve stem 28, which is pivoted at 29 in the pan 24. When the valve 27 is lowered from its seat, fluid may escape through an opening 30 into a hood 31 which is connected with a passage 32 which, in turn, connects to an outlet pipe 33.

The trap 15 operates in the following manner: It discharges liquid through the pipe 25, but will not discharge gas. This will be better understood from the following description of its operation. With the parts in the position shown in Fig. 2, any oil admitted to the opening 16 passes into the bottom of the central cavity, tending to float the pan 24, which seats the valve 27. Any additional liquid which may be admitted into the trap simply assists in this floating action and closes the valve tighter until such a time as the trap is sufficiently full to overflow into the pan 24. Whenever this occurs, the pan fills and sinks, opening the valve 27. The internal pressure of the trap then causes the fluid to flow through the pipe 25, this fluid being taken from inside the pan 24. Before the pan is entirely empty it is again floated, thus closing the valve 27.

The trap 15, therefore, tends to discharge periodically, and to practically maintain the level of the liquid in the chamber 13 at about the level of the inlet end of the pipe 14. The interior of the trap 15 is connected to the top of the chamber 13 by means of a gas equalizing pipe 40. A bypass pipe controlled by a valve 42 is connected around the trap 15, which discharges through pipes 43 and 44, into the top of an auxiliary separator 45.

The lower portion of the separating chamber 13 is connected through a pipe 50 with a standpipe 51, which projects into a water separating chamber 52. The upper end 53, of the pipe 51, is slightly lower than the fluid level in the chamber 13. The water which collects in the bottom of the chamber 13 flows upwardly in the pipe 51, but the water being somewhat heavier than oil, the water in the pipe 51 will not overflow the upper edge 53 until such a time as there is considerable accumulation of water in the chamber 13. In other words, if the chamber 13 is almost entirely filled with oil and the pipe 51 is filled with water, the weight of the water in the pipe 51 will more than overbalance the weight of the oil and the water will not flow out of the end 53, until such time as there is considerable accumulation in the chamber 13. The pipe 51, therefore, acts to drain off the water whenever the level of the water in the chamber 13 reaches a predetermined value. A pipe 54 is provided to equalize the gas pressure between the tops of the chambers 52 and 13, this pipe being extended over into the top of a water trap 55, which takes off water through a pipe 56 from the lower portion of the chamber 52 and delivers it through a pipe 57 into a suitable drain. The water trap 55 is a duplicate of the oil trap 15, and serves to draw off water as fast as it collects in the chamber 52, without permitting gas to escape.

A drawoff pipe 58 is provided with a valve 59 for withdrawing sediment from the chamber 13 and a similar pipe 60, provided with a valve 61, is provided at the bottom of the pipe 51. A water glass 62 is provided for the chamber 13 and a similar water glass 63 is provided for the chamber 52. Gas is withdrawn from the top of the chamber 13 through a pipe 70, which communicates with the top of three expansion chambers 71, 72 and 73, each having a gauge 74, and a plate 75 which has a small hole therein, this hole being so small that a considerable loss of pressure takes place whenever the gas flows therethrough in such quantities as the well produces. The lower portion of the chamber 71 is connected through a pipe 76 with the upper portion of the second expansion chamber 72, and lower portion of the chamber 72 is connected through a pipe 77 with the upper portion of the chamber 73. Gas is taken off from the chamber 73 through a pipe 80, gas also being delivered through a pipe 81 from the chamber 45. Since a considerable expansion takes place in chambers 71, 72 and 73, drain pipes 85 are provided in the lower end of these chambers for removing any condensates which may collect therein.

The oil passing through the pipe 44 into the chamber 45 is delivered on to a spreader cone 90 which is smaller in diameter than the interior of the chamber 45. The oil passes downwardly through the chamber 45 being held on the inner walls of the chamber 45 by lower cones 91 and 92. The cones 91, 92 and 93 are supported by a pipe 94 closed at the top and open at the bottom and having perforations 95 just below the cones 90 and 91. The gas released from the oil passing downwardly in a thin film over the inner walls of the chamber gives up its gas and vapors which pass into the pipe 94 through the open lower end or through the perforations 95. This gas or vapor is then delivered to the pipe 81.

The oil in the chamber 45 is maintained at about the level of a gauge glass 96 by means of an outlet pipe 97 which connects into a trap 98 which is similar in contruction to the trap shown in Fig. 2. Sediment or water may be drawn off from the chamber 45 through a pipe 99, the level of this water or sediment being indicated by a gauge glass 100. The top of the trap 98 is connected to the top of the chamber 45 through a pipe 101 which equalizes the gas pressure between the top of the trap and the chamber.

If the pressure of the well is low the chamber 45 may be dispensed with but where the well pressure is high a real increase in economy is attained. If, for example, the pressure in the chamber 13 is 250 pounds per square inch and this pressure is reduced to say 20 pounds per square inch in the chamber 45, it is evident that a complete separation of the gas cannot take place in the chamber 13 as many of the valuable constituents of the oil are a liquid at atmospheric temperatures and a pressure of 250 pounds per square inch. Upon releasing this pressure these constituents expand into a gas or vapor which would escape from the oil in the storage tanks if the pipe 44 led directly thereto. By passing the oil with its included gases and vapors into the chamber 45 and separating the gases and vapors from the oil in that chamber, I not only save these valuable gases or vapors but also reduce the life and fire hazard about the final storage tanks. Where the well produces silt or fine sand I am able to separate this out in the chamber 13 drawing it off through the pipe 58. By withdrawing these highly abrasive substances at this point I reduce the cutting action in the pressure relieving valves and other parts of the apparatus.

The operation of my invention is entirely automatic. The trap 15 maintaining the fluid level in the chamber 13, and the pipe 51 regulating the water level therein, and the trap 55 then automatically drains off the water from the chamber 52. By the use of the plates 75, I am able to cause practically all of the fall in pressure to take place in the orifices thereof, so that the interiors of the traps 15 and 55 and the chambers 13 and 52 are maintained at or near well pressure. The gas is finally delivered through the pipe 80 to suitable storage or to a gasoline tower.

By the use of my apparatus, I am able to automatically separate the water and gas from the oil, while the oil is still under pressure, also reducing the pressure of the gas to practical values without danger of emulsification.

I claim as my invention:

1. A device for separating gas from a mixture of gas and liquid, which comprises: walls forming a separating chamber, into which the mixture is delivered, and in which the gas is allowed to escape from the liquid; means for withdrawing gas from said chamber and reducing the pressure thereof; a trap into which liquid from said chamber is delivered; means in said trap for preventing gas from blowing therethrough; and means for allowing liquid to escape from said gas trap whenever a definite amount collects therein.

2. A device for separating water and gas from a mixture of water, gas, and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; and means for withdrawing water from said chamber whenever the level of said water exceeds a certain limit.

3. A device for separating water and gas from a mixture of water, gas and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; walls forming a chamber having its upper portion in open communication with the upper portion of said separating chamber; a pipe in open communication with the lower portion of said separating chamber, said pipe projecting into said water outlet chamber to a point a little below the predetermined level of oil in said separating chamber; and means for withdrawing water from said water outlet chamber, whenever the level of water therein exceeds a predetermined value.

4. A device for separating water and gas from a mixture of water, gas, and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; means for maintaining substantially the full pressure of said well in said chambers; and means for withdrawing water from said chamber whenever the level of said water exceeds a certain limit.

5. A device for separating water and gas from a mixture of water, gas and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; means for maintaining substantially the full pressure of said well in said chambers; walls forming a chamber having its upper portion in open communication with the upper portion of said separating chamber; a pipe in open communication with the lower portion of said separating chamber, said pipe projecting into said water outlet chamber to a point a little below the predetermined level of oil in said separating chamber; and means for withdrawing water from said water outlet chamber, whenever the level of water therein exceeds a predetermined value.

6. A device for separating water and gas from a mixture of water, gas and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; walls forming a chamber having its upper portion in open communication with the upper portion of said separating chamber; a pipe in open communication with the lower portion of said separating chamber, said pipe projecting into said water outlet chamber to a point a little below the predetermined level of oil in said separating chamber; a water trap in open communication with the lower portion of said water outlet chamber; means in said trap for preventing gas from blowing through said trap; and means in said trap for discharging water therefrom whenever said trap becomes filled with water.

7. A device for separating water and gas from a mixture of water, gas and oil as produced by an oil well, comprising: walls forming a separating chamber in which said water and oil are allowed to stratify, and in which said gas is allowed to escape from said liquids; means for withdrawing oil from said chamber to maintain the level thereof within certain limits; means for maintaining substantially the full pressure of said well in said chambers; the walls forming a chamber having its upper portion in open comunication with the upper portion of said separating chamber; a pipe in open communication with the lower portion of said separating chamber, said pipe projecting into said water outlet chamber to a point a little below the predetermined level of oil in said separating chamber; a water trap in open communication with the lower portion of said water outlet chamber; means in said trap for preventing gas from blowing through said trap; and means in said trap for discharging water therefrom whenever said trap becomes filled with water.

8. A gas and water separator for use in connection with oil wells, comprising: walls forming a chamber into which a mixture of oil, water, and gas are delivered at full well pressure, and in which said oil and water stratify and said gas escapes from said oil and water; means for withdrawing gas from said chamber; means for automatically withdrawing oil from said chamber in such amounts as to maintain an approximately constant level of said oil in said chamber; and means for automatically withdrawing water from said chamber in such amounts as to maintain an approximately constant level of said water in said chamber.

9. A gas and water separator for use in connection with oil wells, comprising: walls forming a chamber into which a mixture of oil, water, and gas are delivered at full well pressure and in which oil and water stratify and said gas escapes from said oil and water; means for withdrawing gas from said chamber; means for automatically withdrawing oil from said chamber in such amounts as to maintain an approximately constant level of said oil in said chamber; and means for automatically withdrawing water from said chamber in such amounts as to maintain an approximately constant level of said water in said chamber, said means being so arranged that substantially the full well pressure is maintained on said chambers.

10. A device for removing foreign matter and gas from the oil produced by an oil well comprising walls forming a high pressure chamber, maintained under pressure, in which a gravitational separation takes place; means for withdrawing foreign matter from said chamber; means for withdrawing oil from said chamber and reducing the pressure thereon; walls forming a low pressure chamber into which said oil is delivered after the pressure is reduced thereon, said low pressure chamber being maintained at a substantially lower pressure than said high pressure chamber; means for withdrawing oil from said chamber; and means for withdrawing gas or vapor from said chamber.

11. A device for removing foreign matter and gas from the oil produced by an oil well comprising walls forming a high pressure chamber, maintained under pressure, in which a gravitational separation takes place; means for withdrawing foreign matter from said chamber; means for withdrawing oil from said chamber and reducing the pressure thereon; and walls forming a low pressure chamber into which said oil is delivered after the pressure is reduced thereon, said low pressure chamber being maintained at a substantially lower pressure than the said high pressure chamber; means in said low pressure chamber for causing gas or vapor to separate from the oil; means for withdrawing oil from said chamber; and means for withdrawing gas or vapor from said chamber.

In testimony whereof, I have hereunto set my hand at San Francisco, California, this 31st day of October, 1921.

LESTER L. CARTER.